(12) United States Patent
Harada et al.

(10) Patent No.: US 8,146,344 B2
(45) Date of Patent: Apr. 3, 2012

(54) EXHAUST HEAT RECOVERY SYSTEM ABNORMALITY DETECTION DEVICE

(75) Inventors: Osamu Harada, Toyota (JP); Toshitake Sasaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1377 days.

(21) Appl. No.: 11/666,335

(22) PCT Filed: Oct. 7, 2005

(86) PCT No.: PCT/JP2005/018913
§ 371 (c)(1),
(2), (4) Date: Apr. 26, 2007

(87) PCT Pub. No.: WO2006/057114
PCT Pub. Date: Jun. 1, 2006

(65) Prior Publication Data
US 2008/0115487 A1     May 22, 2008

(30) Foreign Application Priority Data
Nov. 25, 2004   (JP) .................................. 2004-340845

(51) Int. Cl.
*F01N 3/00*     (2006.01)
(52) U.S. Cl. ................ 60/277; 60/287; 60/288; 60/298; 60/324

(58) Field of Classification Search ............... 60/277, 60/287, 288, 298, 324, 285, 320
See application file for complete search history.

(56) References Cited

U.S. PATENT DOCUMENTS

| | | | | |
|---|---|---|---|---|
| 5,349,816 A * | 9/1994 | Sanbayashi et al. | ............ | 60/277 |
| 5,522,219 A * | 6/1996 | Orzel et al. | ...................... | 60/274 |
| 6,182,445 B1 * | 2/2001 | Yamazaki et al. | ............... | 60/277 |
| 6,321,533 B1 * | 11/2001 | Watanabe et al. | ............... | 60/324 |
| 6,321,696 B1 | 11/2001 | Nishioka et al. | | |
| 6,401,451 B1 * | 6/2002 | Yasui et al. | ...................... | 60/277 |
| 6,532,808 B1 | 3/2003 | Matsumoto et al. | | |
| 6,792,749 B2 * | 9/2004 | Ueno et al. | ...................... | 60/284 |
| 2004/0187853 A1 | 9/2004 | Ries-Mueller | | |

FOREIGN PATENT DOCUMENTS

| | | |
|---|---|---|
| EP | 1 081 349 A1 | 3/2001 |
| JP | U-61-58501 | 4/1986 |
| JP | U 61-58502 | 4/1986 |
| JP | U-63-118324 | 7/1988 |
| JP | A 05-113156 | 5/1993 |

* cited by examiner

*Primary Examiner* — Binh Q Tran
(74) *Attorney, Agent, or Firm* — Oliff & Berridge, PLC

(57) ABSTRACT

An ECU executes a program including the steps of: when a switching valve is controlled to be closed, comparing exhaust gas's temperature, as detected, with a map value; if the exhaust gas's temperature is larger than the map value, determining that the switching valve normally operates; and if the exhaust gas's temperature is smaller than the map value, determining that the switching valve has abnormality.

32 Claims, 9 Drawing Sheets

EXHAUST HEAT RECOVERY SYSTEM ABNORMALITY DETECTION DEVICE

TECHNICAL FIELD

The present invention relates generally to exhaust heat recovery system abnormality detection devices and particularly to abnormality detection devices detecting whether an exhaust gas path switching valve has abnormality.

BACKGROUND ART

Conventionally, thermal energy of exhaust gas exhausted from automobile engines has been recovered by employing techniques. For example, there has been proposed an exhaust heat recovery system attaching an exhaust heat recovery device (e.g., a heat exchanger) to an automobile's exhaust heat system to absorb thermal energy of exhaust gas to use the absorbed thermal energy for heating, a water heater, and the like. In The thus configured exhaust heat recovery system if the exhaust heat recovery device has abnormality the abnormality must be detected as early as possible in order to prevent secondary abnormality attributed to the exhaust heat recovery device. For example, Japanese Utility Model Laying-Open No. 61-58502 discloses an exhaust gas heat exchanger damage detection device capable of preventing an engine from damage caused when the exhaust gas heat exchanger is damaged. This damage detection device provides at an intermediate portion of an exhaust pipe connected to the engine the exhaust gas heat exchanger to recover thermal energy of exhaust gas in the form of hot water and vapor. The damage detection device is provided with an abnormality detector detecting variation in temperature or pressure caused at locations closer to a water inlet and a water outlet, respectively, that is caused when the exhaust gas heat exchanger is damaged. When these abnormality detectors detect abnormality and signal accordingly, the damage detection device responsively closes an electromagnetic valve provided at an intermediate portion of the exhaust pipe connecting the engine and the exhaust gas heat exchanger or an electromagnetic valve provided at the exhaust gas heat exchanger adjacent to the water inlet.

As disclosed in the document, the damage detection device includes an abnormality detector provided at an exhaust gas heat exchanger adjacent to a water inlet and a water outlet to detect whether the exhaust gas heat exchanger has abnormality and if so the damage detection device closes an electromagnetic valve provided at an exhaust pipe or the exhaust gas heat exchanger adjacent to the water outlet to prevent an engine from damage caused when the exhaust gas heat exchanger is damaged.

An exhaust heat recovery system having an exhaust heat recovery device connected parallel to an exhaust pipe is provided with a switching valve switched to pass exhaust gas from the exhaust pipe to the exhaust heat recovery device in recovering exhaust heat. If the switching valve has abnormality the exhaust heat recovery device cannot receive the exhaust gas and hence recover thermal energy.

The damage detection device disclosed in the aforementioned document has the exhaust heat recovery device provided in series with the exhaust pipe, and does not allow for the switching valve's abnormality.

DISCLOSURE OF THE INVENTION

The present invention contemplates an exhaust heat recovery system abnormality detection device detecting whether an exhaust gas path switching valve has abnormality.

The present invention in one aspect provides an abnormality detection device detecting whether an exhaust heat recovery system recovering exhaust heat from exhaust gas exhausted from an engine has abnormality. The exhaust heat recovery system includes a bypass connected parallel to an exhaust path passing the exhaust gas, an exhaust heat recovery unit provided at the bypass to recover the exhaust heat, and a switching valve switched to pass the exhaust gas through the bypass. The abnormality detection device includes: a gas temperature detector disposed at least one of the bypass and the exhaust path to detect the exhaust gas's temperature; and a determinator determining from the temperature whether the switching valve has abnormality.

In accordance with the present invention a gas temperature detector is disposed at a bypass or an exhaust path to detect exhaust gas's temperature. A determinator determines from the detected temperature whether a switching valve has abnormality. For example if the bypass is provided with the gas temperature detector and the switching valve is switched to pass exhaust gas through the bypass the gas temperature detector detects that the exhaust gas's temperature (or variation in temperature) increases. As such, when the switching valve is switched to pass exhaust gas through the bypass and the gas temperature detector nonetheless detects that the exhaust gas's temperature (variation in temperature) is low, a decision can be made that the bypass is not passing the exhaust gas and hence the switching valve has abnormality. Thus the exhaust heat recovery system's abnormality detection device can detect that the exhaust gas path switching valve has abnormality.

Preferably the abnormality detection device further includes a rotation rate detector detecting the engine's rate of rotation. The determinator determines whether the switching valve has abnormality from whether the detected temperature and the rate of rotation have a relationship corresponding to a predetermined relationship.

In accordance with the present invention the determinator determines whether the switching valve has abnormality from whether the detected temperature and the engine's rate of rotation have a relationship corresponding to a predetermined relationship. For example if the bypass is provided with the gas temperature detector and the switching valve is switched to pass exhaust gas through the bypass the gas temperature detector detects that the exhaust gas's temperature (or variation in temperature) increases. The exhaust gas's temperature has a tendency to vary to correspond to a predetermined (e.g., proportional) relationship in accordance with how the engine's rate of rotation varies. Accordingly, if the exhaust gas's temperature as detected and the engine's rate of rotation fail to provide a relationship corresponding to the predetermined relationship (e.g., if the exhaust gas's temperature as detected is lower than that calculated from the engine's rate of rotation as detected and the predetermined relationship) a decision can be made that the exhaust gas is not passed through the bypass and hence the switching valve has abnormality.

Still preferably the determinator determines whether the switching valve has abnormality from the detected temperature's variation with time.

In accordance with the present invention the determinator determines whether the switching valve has abnormality from the detected temperature's variation with time. For example if the bypass is provided with the gas temperature detector and the switching valve is switched to pass exhaust gas through the bypass the gas temperature detector detects that the exhaust gas's variation in temperature with time increases. Accordingly, when the switching valve is switched and the exhaust gas's temperature as thereafter detected varies with time by an amount for example smaller than a predetermined value a decision can be made that the exhaust gas is not passed through the bypass and hence the switching valve has abnormality.

The present invention in another aspect provides an abnormality detection device of an exhaust heat recovery system detecting whether an exhaust heat recovery system recovering exhaust heat from exhaust gas exhausted from an engine has abnormality. The exhaust heat recovery system includes a bypass connected parallel to an exhaust path passing the exhaust gas, an exhaust heat recovery unit provided at the bypass to recover the exhaust heat, and a switching valve switched to pass the exhaust gas through the bypass. The abnormality detection device includes a recovery detector detecting exhaust heat recovery done by the exhaust heat recovery unit, and a determinator determining from the exhaust heat recovery whether the switching valve has abnormality.

In accordance with the present invention a recovery detector (e.g., a temperature sensor) detects exhaust heat recovery done by an exhaust the recovery unit (e.g., a heat exchanger having an interior with a medium passing therethrough) (e.g., the medium's variation in temperature). A determinator determines from the detected exhaust heat recovery whether a switching valve has abnormality. When the switching valve is switched to pass exhaust gas through a bypass the recovery detector detects how the exhaust heat recovery varies. Accordingly, when the switching valve is switched and exhaust heat recovery thereafter does not vary (e.g., if the temperature's variation is lower than a predetermined value) a decision can be made that the exhaust gas is not passed through the bypass and hence the switching valve has abnormality. Thus the exhaust heat recovery system's abnormality detection device can detect that the exhaust gas path switching valve has abnormality.

Preferably, the abnormality detection device further includes a rotation rate detector detecting the engine's rate of rotation. The determinator determines whether the switching valve has abnormality from whether the detected exhaust heat recovery and the rate of rotation have a relationship corresponding to a predetermined relationship.

In accordance with the present invention the determinator determines whether the switching valve has abnormality from whether the detected exhaust heat recovery and the engine's rate of rotation have a relationship corresponding to a predetermined relationship. When the switching valve is switched to pass exhaust gas through a bypass, a recovery detector (e.g., a temperature sensor) detects exhaust heat recovery done by an exhaust the recovery unit (e.g., a heat exchanger having an interior with a medium passing therethrough) (e.g., the medium's variation in temperature). The exhaust heat recovery has a tendency to vary to correspond to a predetermined (e.g., proportional) relationship in accordance with how the engine's rate of rotation varies. Accordingly, if the exhaust heat recovery's variation as detected and the engine's rate of rotation fail to provide a relationship corresponding to the predetermined relationship (e.g., if the temperature's variation as detected is lower than that calculated from the engine's rate of rotation as detected and the predetermined relationship) a decision can be made that the exhaust gas is not passed through the bypass and hence the switching valve has abnormality.

Still preferably the exhaust heat recovery unit includes a heat exchanger disposed on the bypass and a medium path passing a medium through the heat exchanger. The recovery detector detects the exhaust heat recovery from the medium's variation in temperature.

In accordance with the present invention a recovery detector (e.g., a temperature sensor) detects how exhaust heat is recovered (e.g., an amount of variation in temperature of a medium passing through a medium path located in a heat exchanger arranged on a bypass) from the medium's variation in temperature. When the switching valve is switched to pass exhaust gas through the bypass the exhaust gas contacts the heat exchanger and has its thermal energy absorbed by the heat exchanger. The absorbed thermal energy increases in temperature the medium passing through the medium path arranged in the heat exchanger. By the medium's variation in temperature in the heat exchanger, how exhaust heat is recovered can be detected.

Still preferably the medium path includes an upstream path introducing the medium into the heat exchanger, and a downstream path guiding and thus outputting the medium from the heat exchanger. The recovery detector includes an upstream temperature detector detecting an upstream temperature of the medium passing through the upstream path, and a downstream temperature detector detecting a downstream temperature of the medium passing through the downstream path. The determinator determines from a difference between the upstream and downstream temperatures whether switching valve has abnormality.

In accordance with the present invention the recovery detector (e.g., a temperature sensor) detects the upstream temperature of the medium passing through the upstream path, and the downstream temperature of the medium passing through the downstream path. The determinator determines from a difference as detected between the upstream and downstream temperatures whether switching valve has abnormality. When the switching valve is switched to pass exhaust gas through the bypass the exhaust gas contacts the heat exchanger and has its thermal energy absorbed by the heat exchanger. The absorbed thermal energy increases in temperature the medium passing through the medium path arranged in the heat exchanger. Upstream temperature and downstream temperature can be detected and their difference obtained to detect how the exhaust heat recovery unit recovers exhaust heat (e.g., the medium's variation in temperature). Thus from the difference between the upstream temperature and the downstream temperature (e.g., if the upstream temperature and the downstream temperature have a difference smaller than a predetermined value), a decision can be made that the bypass does not have exhaust gas passing therethrough and hence the switching valve has abnormality.

Still preferably, the recovery detector includes a temperature detector detecting the medium's temperature. The determinator includes a first temperature calculator operative in response to the medium's temperature as detected attaining a predetermined first decision making temperature to calculate a first temperature corresponding to a period elapsing before the first decision making temperature is attained, and a first abnormality determinator determining that the switching valve has abnormality when the first decision making temperature is smaller than the first temperature.

In accordance with the present invention a recovery detector (e.g., a temperature sensor) detects a medium's temperature. When the temperature as detected attains a predetermined first decision making temperature the determinator calculates a first temperature corresponding to a period elapsing before the first decision making temperature is attained, and if the first decision making temperature is smaller than the first temperature the determinator determines that the switching valve has abnormality. The first temperature is calculated for example from a quantity of heat recovered by the exhaust heat recovery unit when the bypass passes exhaust gas. Accordingly, if the first decision making temperature is lower than the first temperature (e.g., a lower limit value's temperature) calculated from a quantity of heat recovered for a period elapsing after the switching valve is switched and before the first decision making temperature is attained, then a decision can be made that the exhaust heat recovery unit fails to recover a quantity of heat as estimated and hence the bypass is not passing the exhaust gas. Thus a decision can be made that the switching valve has abnormality.

Still preferably, the first temperature is a temperature calculated from a quantity of heat recovered by the exhaust heat recovery unit when the bypass passes the exhaust gas.

In accordance with the present invention the first temperature is a temperature calculated from a quantity of heat recovered by the exhaust heat recovery unit (e.g., a heat exchanger) when the bypass passes the exhaust gas. Accordingly, if the first decision making temperature is lower than the first temperature (e.g., a lower limit value's temperature) calculated from a quantity of heat recovered for a period elapsing after the switching valve is switched and before the first decision making temperature is attained, then a decision can be made that the exhaust heat recovery unit fails to recover a quantity of heat as estimated and hence the bypass is not passing the exhaust gas. Thus a decision can be made that the switching valve has abnormality.

Still preferably the quantity of heat recovered is calculated from an amount of air aspirated by the engine, an amount of fuel injected, the engine's rate of rotation, and the medium's temperature.

In accordance with the present invention the quantity of heat recovered is calculated from an amount of air aspirated by the engine, an amount of fuel injected, the engine's rate of rotation, and the medium's temperature. In other words, the quantity of heat recovered is calculated depending on the engine's load state. Thus a quantity of heat recovered depending on the engine's state can be calculated with high precision, and whether the switching valve has abnormality can be detected with high precision.

Still preferably the medium path is connected to a cooling path of the engine. The engine is provided with an open and close valve introducing the medium from the engine to a radiator in accordance with the medium's temperature. The abnormality detection device further includes: a second temperature calculator operative in response to the medium's temperature as detected attaining a predetermined second decision making temperature to calculate a second temperature corresponding to a period elapsing before the second decision making temperature is attained; and a second abnormality determinator determining that the open and close valve has abnormality when the second decision making temperature is smaller than the second temperature.

In accordance with the present invention the medium path is connected to a cooling path of the engine. The engine is provided with an open and close valve (e.g., a thermostat) introducing the medium from the engine to a radiator in accordance with the medium's temperature. For example when the engine is started and starts to be warmed up the open and close valve is closed to prevent the radiator from receiving and passing the medium therethrough, and as the medium passing through the engine's cooling path increases in temperature the open and close valve starts to open. When the engine is completely warmed up, the open and close valve is fully open. If such an open and close valve has abnormality and is open when the engine starts to be warmed up, the medium passes through the radiator. As such, the medium's temperature (i.e., that of a coolant for the engine) hardly increases. The determinator determines that the open and close valve has abnormality when the second decision making temperature is smaller than the second temperature, which is a temperature calculated for example from the medium's variation in temperature estimated when the radiator does not have the medium passing therethrough (e.g., the temperature of a lower limit value with the thermostat in normal condition). If the second decision making temperature is lower than the second temperature as calculated a decision can be made that the radiator passes the medium and hence the open and close valve has abnormality.

Still preferably the second temperature is a temperature calculated from the medium's variation in temperature estimated when the radiator does not have the medium passing therethrough.

In accordance with the present invention the second temperature is a temperature calculated from the medium's variation in temperature estimated when the radiator does not have the medium passing therethrough (e.g., the temperature of a lower limit value with the thermostat in normal condition). Accordingly, if the second decision making temperature is lower than the second temperature as calculated a decision can be made that the radiator passes the medium and hence the open and close valve has abnormality.

Still preferably the first decision making temperature is equal to the second decision making temperature. The abnormality detection device further includes: a third temperature calculator operative in response to the medium's temperature as detected attaining the first decision making temperature to calculate a predetermined third temperature corresponding to a period elapsing before the first decision making temperature is attained; and a third abnormality determinator determining that the open and close valve and the switching valve have abnormality when the first decision making temperature is smaller than the third temperature.

In accordance with the present invention when the open and close valve (e.g., a thermostat) has abnormality, and the engine also starts to be warmed up and the radiator passes the medium, the radiator dissipates heat and the medium hardly increases in temperature. Furthermore, if the switching valve is in abnormal condition (or the bypass does not pass exhaust gas) and the exhaust heat recovery unit does not absorb the exhaust gas's thermal energy, the medium's temperature hardly increases. The abnormality detection device determine that the open and close valve and the switching valve have abnormality when the first decision making temperature is smaller than the third temperature. The third temperature is a lower one of temperatures calculated from the medium's variation in temperature estimated when either one of the open and close valve and the switching valve is in abnormal condition. Accordingly, if the first decision making temperature is lower than the third temperature as calculated, a decision can be made that the radiator passes the medium and hence the bypass does not pass the exhaust gas. Thus a decision can be made that both the open and close valve and the switching valve have abnormality.

Still preferably the third temperature is a lower one of temperatures calculated from the medium's variation in temperature estimated when either one of the open and close valve and the switching valve is in abnormal condition.

In accordance with the present invention the third temperature is a lower one of temperatures calculated from the medium's variation in temperature estimated when either one of the open and close valve and the switching valve is in abnormal condition. Accordingly, if the first decision making temperature is lower than the third temperature as calculated, a decision can be made that the radiator passes the medium and hence the bypass does not pass the exhaust gas. Thus a decision can be made that both the open and close valve and the switching valve have abnormality.

Still preferably the first decision making temperature is different from the second decision making temperature. The determinator determines whether the switching valve has abnormality at a temporal point different than when the second abnormality determinator determines whether the open and close valve has abnormality.

In accordance with the present invention the determinator determines whether the switching valve has abnormality at a temporal point different than when the second abnormality determinator determines whether the open and close valve has abnormality. Determining at a temporal point whether the open and close valve has abnormality and determining at a different temporal point whether the switching valve has abnormality, can provide a decision on abnormality with high precision. Erroneous decision on the open and close valve or the switching valve can be prevented.

Still preferably the determinator determines whether the switching valve has abnormality after the second abnormality determinator determines whether the open and close valve has abnormality.

In accordance with the present invention the determinator determines whether the switching valve has abnormality after the second abnormality determinator determines whether the open and close valve has abnormality. More specifically, when the second decision making temperature is detected and it is smaller than the second temperature corresponding to a period elapsing before the second decision making temperature is attained, the second abnormality determiner determined that the open and close valve has abnormality, and when the first decision making temperature is detected and it is smaller than the first temperature corresponding to a period elapsing before the first decision making temperature is attained, a decision is made that the switching valve has abnormality. Determining at a temporal point whether the open and close valve has abnormality and determining at a different temporal point whether the switching valve has abnormality, can prevent erroneous decision and provide a decision on abnormality with high precision.

Still preferably the medium path includes a downstream path guiding and thus outputting the medium from the heat exchanger and the recovery detector detects the medium's temperature at the downstream path.

In accordance with the present invention the recovery detector can detect the medium's temperature at the downstream path to detect the medium's variation in temperature corresponding to the exhaust heat recovery unit's exhaust heat recovery.

BEST MODES FOR CARRYING OUT THE INVENTION

Hereinafter reference will be made to the drawings to describe an abnormality detection device of an exhaust heat recovery system in embodiments of the present invention. In the following description, identically denoted components are identical in name and function.

First Embodiment

Figure 1:
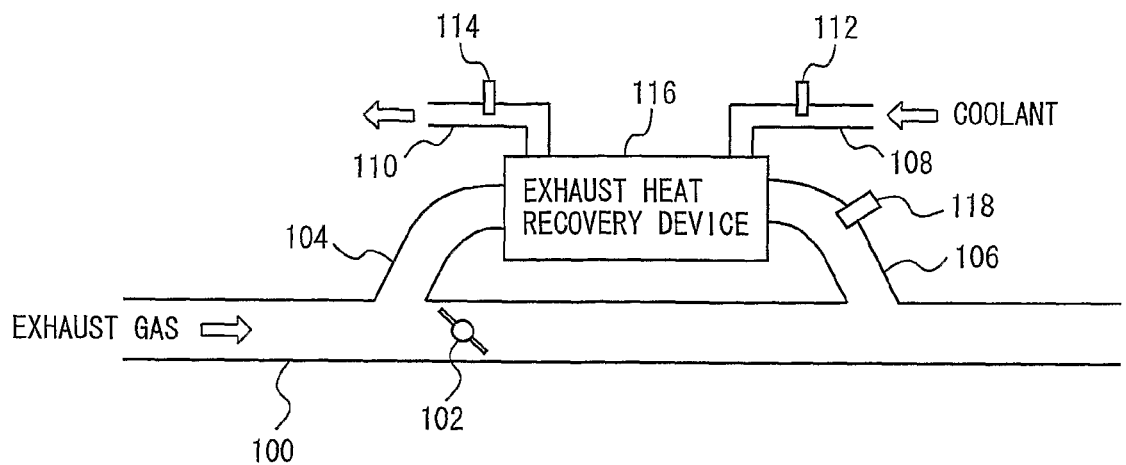
FIG. 1 shows a configuration of an exhaust heat recovery system in a first embodiment.

As shown in FIG. 1, the present embodiment provides an exhaust heat recovery system including bypasses 140, 160 connected parallel to an exhaust pipe 100 passing exhaust gas therethrough, an exhaust heat recovery device 116 disposed between bypasses 104 and 106, a switching valve 102 disposed in exhaust pipe 100, and a gas temperature sensor 118 disposed at bypass 106.

Exhaust pipe 100 passes exhaust gas exhausted from an engine. The exhaust gas passes through a ternary catalyst converter (not shown) and a muffler (also not shown) and is subsequently exhausted outside the vehicle. Exhaust pipe 100 is provided with switching valve 102 at a location downstream of a branch to bypass 104 and upstream of a confluence with bypass 106. When switching valve 102 is closed, switching valve 102 closes the path, and exhaust gas passing through exhaust pipe 100 passes through bypass 104. After it has passed through exhaust heat recovery device 116, the exhaust gas passes through bypass 106 and flows into exhaust pipe 100. When switching valve 102 is opened, a configuration is provided to prevent exhaust gas from flowing into bypass 104. For example, the configuration may be adapted to close the passage to bypass 104 when switching valve 102 is opened. Alternatively, the structure may be adapted to reduce bypass 104 in cross section to provide increased resistance against the exhaust gas's flow so that when switching valve 102 is opened the exhaust gas can flow through exhaust pipe 100, although the configuration is not limited thereto.

Switching valve 102 is driven for example by an actuator, a vacuum switching valve (VSV) or the like driven as controlled by an electronic control unit (ECU) (not shown) to open and close switching valve 102, as controlled.

Gas temperature sensor 118 detects temperature in bypass 106. Gas temperature sensor 118 may be any temperature sensor that can endure exhaust gas's high temperature and pressure.

Exhaust heat recovery device 116 is composed of a heat exchanger (not shown) and a medium path passing a medium through the heat exchanger. The medium path includes an upstream path 108 introducing the medium into the heat exchanger and a downstream path 110 guiding and thus outputting the medium from the heat exchanger. Upstream and downstream paths 108 and 110 are connected to a cooling path provided closer to the engine. Upstream path 108 is provided with an upstream temperature sensor 112 detecting a temperature A of the medium passing through upstream path 108. Downstream path 110 is provided with a downstream temperature sensor 114 detecting a temperature B of the medium passing through downstream path 110. Upstream and downstream temperature sensors 112 and 114 detects temperatures A and B and transmits detection signals corresponding thereto to the ECU. Note that while in the present embodiment the medium (a so-called coolant) is for example a liquid medium, it is not limited thereto and may for example be a gaseous medium.

Furthermore, the engine is provided with a rotation rate detection sensor detecting the engine's rate of rotation. Although the rotate rate detection sensor is not limited to any particular sensor, it is for example a crank position sensor arranged at a crank shaft. The crank position sensor detects the engine's rate of rotation and accordingly transmits a detection signal to the ECU.

In the present exhaust heat recovery system when the engine starts, and starts to warm up, the ECU controls switching valve 102 to be closed. When switching valve 102 is closed, bypass 104 can pass exhaust gas and exhaust heat recovery device 116 can recover the exhaust gas's thermal energy. More specifically, the heat exchanger provided at exhaust heat recovery device 116 and the exhaust gas contact and thus exchange heat and the medium passing through the heat exchanger increases in temperature. As upstream and downstream paths 108 and 110 are connected to a path of a medium cooling the engine, the engine's coolant can also increase in temperature, and the engine can be warmed up faster. If switching valve 102 has abnormality, however, the exhaust gas does not pass through bypass 104 and exhaust heat recovery device 116 may inappropriately functions.

The present invention is characterized in that the exhaust heat recovery system configured as described above has an abnormality detection device detecting whether switching valve 102 has abnormality. More specifically, the present exhaust heat recovery system's abnormality detection device is implemented by an ECU determining whether switching valve 102 has abnormality from exhaust gas's temperature detected by gas temperature sensor 118.

Figure 2:
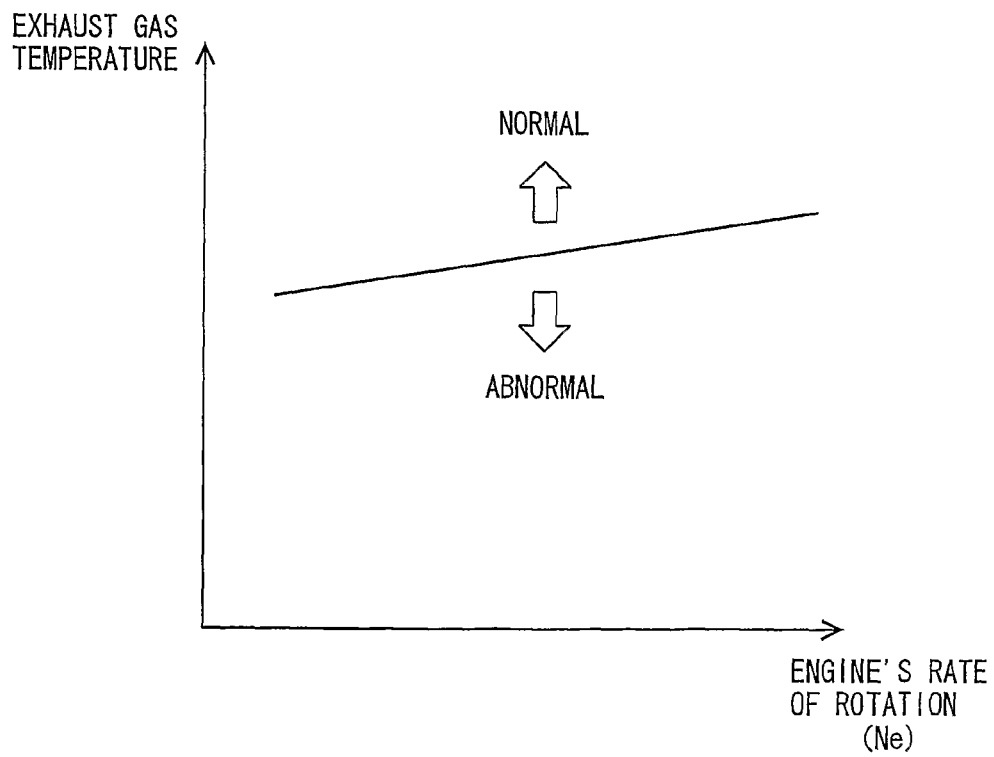
FIG. 2 represents a relationship between exhaust heat's temperature and an engine's rate of rotation.

When switching valve 102 is closed, bypasses 104 and 106 pass exhaust gas, and gas temperature sensor 118 can detect that the exhaust gas increases in temperature. The exhaust gas's temperature has a predetermined relationship with the engine's rate of rotation. More specifically, as shown in FIG. 2, the exhaust gas's temperature and the engine's rate of rotation have a linear or proportional relationship. As such, if the ECU controls switching valve 102 to be closed and the exhaust gas's temperature detected by gas temperature sensor 118 and the engine's rate of rotation detected by the crank position sensor fail to correspond to the predetermined relationship, the ECU determines that switching valve 102 has abnormality.

More specifically, with reference to the FIG. 2 map, when the exhaust gas's temperature as detected and the engine's rate of rotation as detected provide a level upper than the solid line indicated in the map, the ECU determines that switching valve 102 normally operates, and when the exhaust gas's temperature as detected and the engine's rate of rotation as detected provide a level lower than the solid line indicated in the map, the ECU determines that switching valve 102 has abnormality.

Hereinafter with reference to FIG. 3 the present exhaust heat recovery system's abnormality detection device or ECU executes a program structured for control, as will now be described hereinafter.

At step (S) 1000 the ECU determines whether switching valve 102 is controlled to be closed. If so (YES at S1000), the process proceeds with S1100. Otherwise (NO at S1000) the process proceeds with S1200.

At S1100 the ECU determines whether exhaust gas has temperature, as detected by gas temperature sensor 118, larger than a value obtained from the FIG. 2 map. More specifically, the ECU refers to the FIG. 2 map to determine whether the exhaust gas's temperature as detected and the engine's rate of rotation as detected provide a level upper than the solid line indicated in the map. If the exhaust gas's temperature as detected is larger than the value obtained from the map (YES at S1100) the process proceeds with S1300. Otherwise (NO at S1100) the process proceeds with S1400.

At S1200 the ECU determines whether the exhaust gas has temperature, as detected by gas temperature sensor 118, smaller than the value obtained from the FIG. 2 map. More specifically, the ECU refers to the FIG. 2 map to determine whether the exhaust gas's temperature as detected and the engine's rate of rotation as detected provide a level lower than the solid line indicated in the map. If the exhaust gas's temperature as detected is lower than the value obtained from the map (YES at S1200) the process proceeds with S1300. Otherwise (NO at S1200) the process proceeds with S1400.

At S1300 the ECU determines that switching valve 120 normally operates. At S1400 the ECU determines that switching valve 102 has abnormality.

In accordance with such structure and flow chart as described above the present exhaust heat recovery system's abnormality detection device or ECU operates as will be described hereinafter.

When the engine starts, the ECU controls switching valve 102 to be closed (YES at S1000). When switching valve 102 is closed, exhaust gas passes through bypasses 104 and 106. Accordingly, bypasses 104 and 106 is internally increased in temperature, and if the exhaust gas's temperature detected by gas temperature sensor 118 is, as seen on the FIG. 2 map, larger than a value corresponding to the engine's rate of rotation as detected (YES at S1100) a decision is made that switching valve 102 normally operates (S1300). If the exhaust gas's temperature as seen on the FIG. 2 map is smaller than the value corresponding to the engine's rate of rotation as detected (NO at S1100) a decision is made that switching valve 102 has abnormality (S1400).

When the engine's coolant increases in temperature and has completely been warmed up, the ECU controls switching valve 102 to be opened (NO at S1000). When switching valve 102 is opened, the exhaust gas passes through exhaust pipe 100. Accordingly, bypasses 104 and 106 have their internal temperature decreased, and if the exhaust gas's temperature detected by gas temperature sensor 118 is, as seen on the FIG. 2 map, larger than a value corresponding to the engine's rate of rotation as detected (NO at S1200) a decision is made that switching valve 102 has abnormality (S1400). If the exhaust gas's temperature as seen on the FIG. 2 map is smaller than the value corresponding to the engine's rate of rotation as detected (YES at S1200) a decision is made that switching valve 102 normally operates (S1300).

Thus in the present exhaust heat recovery system's abnormality detection device when a switching valve is switched to allow a bypass to have exhaust gas passing therethrough a gas temperature sensor detects that the exhaust gas increases in temperature. The exhaust gas's temperature exhibits a tendency to vary to correspond proportionally to the engine's variation in rate of rotation. As such, if the exhaust gas' temperature as detected is lower than the exhaust gas's temperature as calculated from the engine's rate of rotation as detected and the map, a decision can be made that the exhaust gas is not passing through the bypass and hence the switching valve has abnormality. Thus the exhaust heat recovery system's abnormality detection device can detect that the exhaust gas path switching valve has abnormality.

In the present embodiment a relationship between exhaust gas's temperature and an engine's rate of rotation, as shown in FIG. 2, is used to determine whether switching valve 102 has abnormality. Alternatively, a relationship between a difference of temperatures A and B detected by upstream and downstream temperature sensors 112 and 114, respectively, i.e., an amount of variation in temperature of a medium at a heat exchanger (i.e., an exhaust heat recovery level), and the engine's rate of rotation may be used to determine whether switching valve 102 has abnormality. The medium's variation in temperature at the heat exchanger and the engine's rate of rotation have a proportional relationship similar to that shown in the FIG. 2 map. As such, if temperatures A and B as detected provide a difference or variation in temperature smaller than that calculated from the engine's rate of rotation as detected and the map, a decision may be made that the exhaust gas is not passing through the bypass and hence switching valve 102 has abnormality.

While in the present embodiment gas temperature sensor 118 is arranged in bypass 106, the sensor may be arranged in bypass 104.

Alternatively, gas temperature sensor 118 may be arranged at exhaust pipe 100 downstream of a branch to bypass 104 and upstream of a confluence with bypass 106. When bypass 106 has exhaust gas passing therethrough, gas temperature sensor 118 detects that the exhaust gas decreases in temperature. If switching valve 102 is controlled to be closed and the sensor nonetheless detects that temperature does not decrease, a decision can be made that switching valve 102 has abnormality.

The gas temperature sensor is only required to be provided at least any of the bypass and the exhaust pipe, and a plurality of gas temperature sensors may be provided.

Furthermore, gas temperature sensor 118 may be a sensor outputting an ON signal when exhaust gas passes through bypass 104. By the sensor's ON/OFF signal whether the bypass has exhaust gas passing therethrough and hence whether switching valve 102 has abnormality can be detected.

Second Embodiment

A second embodiment provides an exhaust heat recovery system's abnormality detection device as described hereinafter.

The present embodiment provides an exhaust heat recovery system's abnormality detection device different from that of the first embodiment in that the ECU executes a program having a different structure for control. Except that, it is configured to be identical to that of the first embodiment and accordingly, labeled identically and also identical in function.

Figure 4:
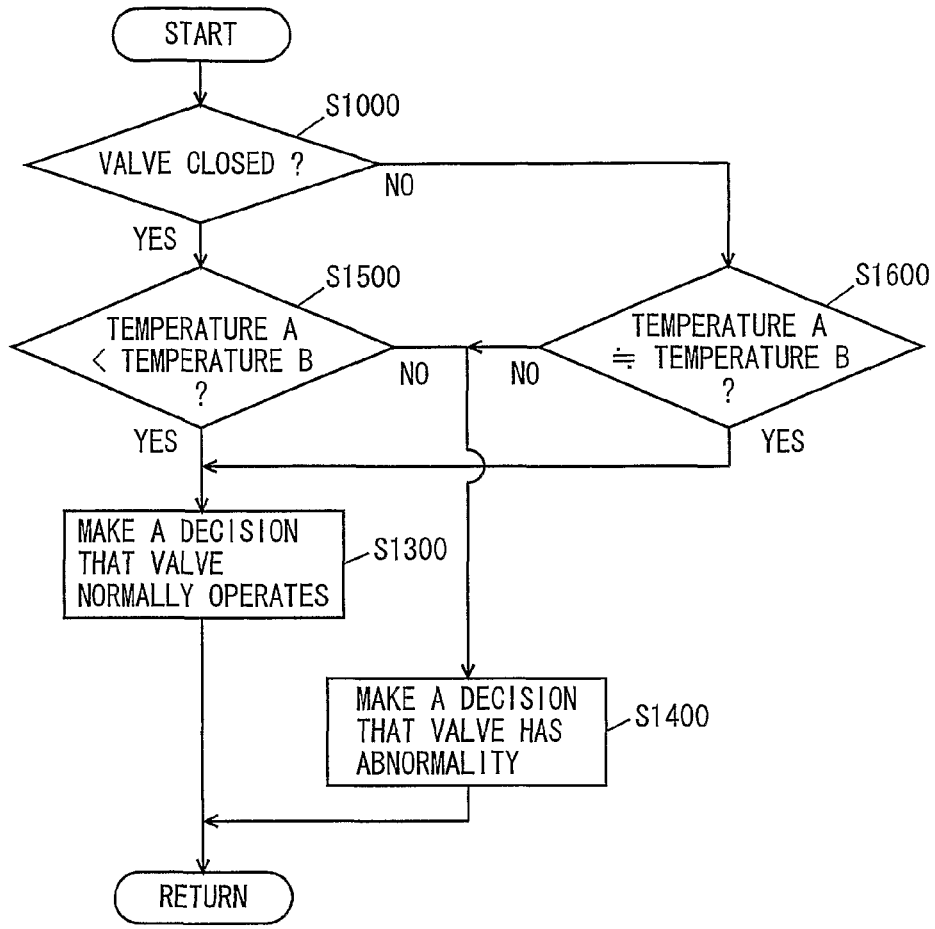
FIG. 4 is a flow chart representing a structure of a program for control executed by an ECU implementing an exhaust heat recovery system abnormality detection device in a second embodiment.

With reference to FIG. 4, the present exhaust heat recovery system's abnormality detection device, or an ECU, executes a program having a structure for control, as described hereinafter.

Figure 3:
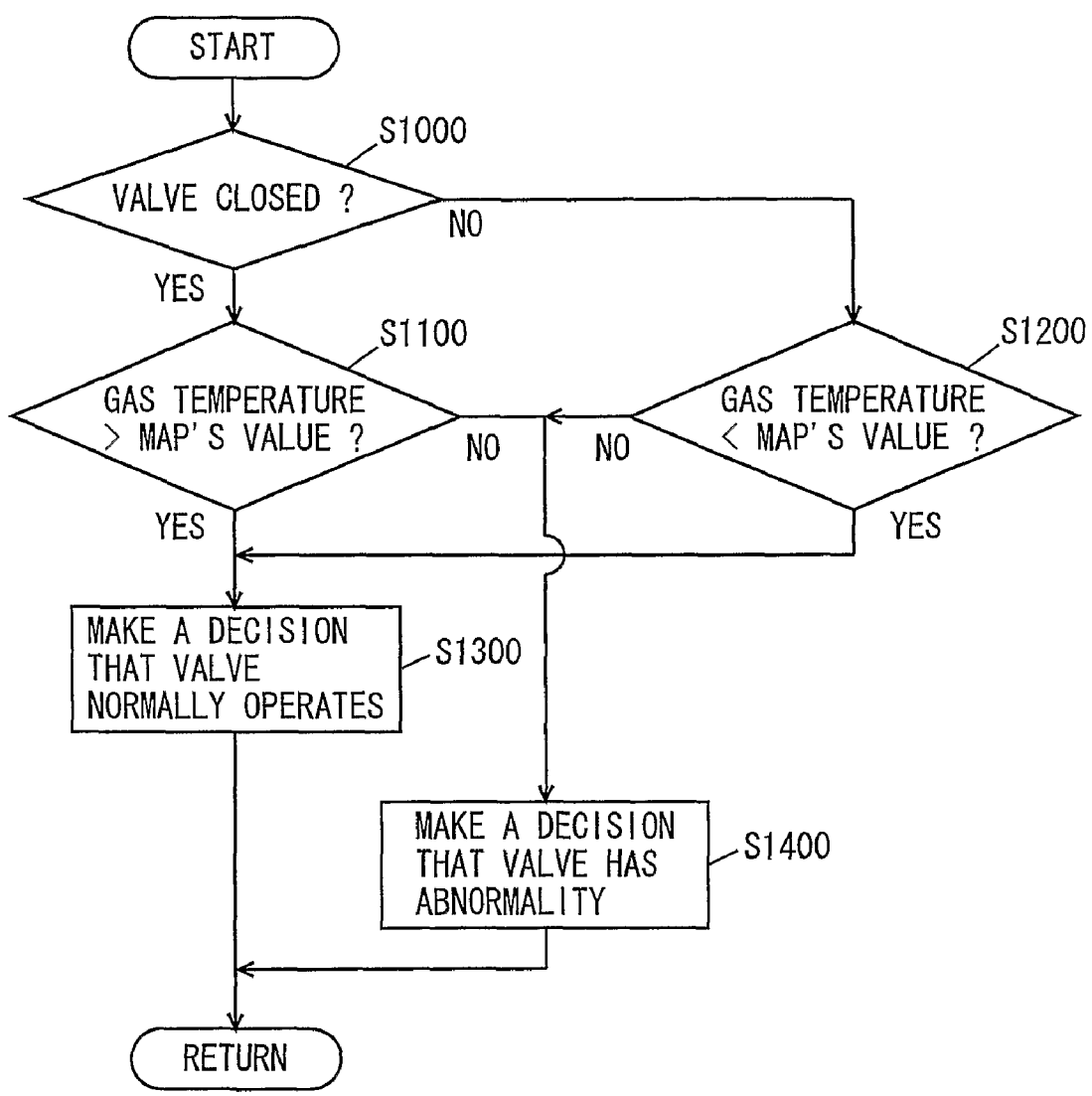
FIG. 3 is a flow chart representing a structure of a program for control executed by an ECU implementing an exhaust heat recovery system abnormality detection device in the first embodiment.

Note that in the FIG. 4 flow chart any step identical to that indicated in the FIG. 3 flow chart is identically labeled.

At S1500 the ECU determines whether temperature A detected by upstream temperature sensor 112 is smaller than temperature B detected by downstream temperature sensor 114. If so (YES at S1500) the process proceeds with S1300, otherwise (NO at S1500) the process proceeds with S1400.

At S1600 the ECU determines whether temperature A is substantially equal to temperature B for example by whether temperature A and temperature B provide a difference having no more than a predetermined value. If so (YES at S1600) the process proceeds with S1300. Otherwise (NO at S1600) the process proceeds with S1400.

In accordance with such structure and flow chart as described above the present exhaust heat recovery system's abnormality detection device or ECU operates as will be described hereinafter.

When the engine starts, the ECU controls switching valve 102 to be closed (YES at S1000). When switching valve 102 is closed, exhaust gas passes through bypasses 104 and 106. The exhaust gas contacts the heat exchanger of exhaust heat recovery device 116 disposed between bypasses 104 and 106, and thus has thermal energy absorbed by a medium passing through the heat exchanger. When the thermal energy is absorbed, temperature B increases, and if temperature A detected by upstream temperature sensor 112 is smaller than temperature B detected by downstream temperature sensor 114 (YES at S1500) a decision can be made that exhaust heat recovery device 116 recovers exhaust heat and hence switching valve 102 normally operates (S1300).

If temperature A is larger than temperature B (NO at S1500), a decision can be made that exhaust heat recovery device 116 fails to recover exhaust heat and hence switching valve 102 has abnormality (S1400).

When the engine's coolant increases in temperature and the engine is thus completely warmed up, the ECU controls switching valve 102 to be opened (NO at S1000). When switching valve 102 is opened, the exhaust gas passes through exhaust pipe 100. As such, the heat exchanger does not exchange heat and temperature B accordingly decreases, and if temperature A and temperature B are substantially equal (YES at S1600) a decision can be made that exhaust heat recovery device 116 does not recover exhaust heat and hence switching valve 102 normally operates (S1300). If temperature A and temperature B are not equal (NO at S1600) a decision is made that switching valve 102 has abnormality (S1400).

Thus in the present exhaust heat recovery system's abnormality detection device when a switching valve is switched to allow a bypass to have exhaust gas passing therethrough the exhaust gas contacts a heat exchanger so that in the heat exchanger the exhaust gas's thermal energy is absorbed by a coolant. The absorbed thermal energy increases temperature B of the coolant guided and thus output from the heat exchanger, and an ECU can determine from variation in temperature as detected (i.e., a difference between temperatures A and B) whether the bypass passes exhaust gas and hence whether the switching valve has abnormality. Thus the exhaust heat recovery system's abnormality detection device can detect that the exhaust gas path switching valve has abnormality.

Third Embodiment

A third embodiment provides an exhaust heat recovery system's abnormality detection device as will be described hereinafter.

Figure 5:
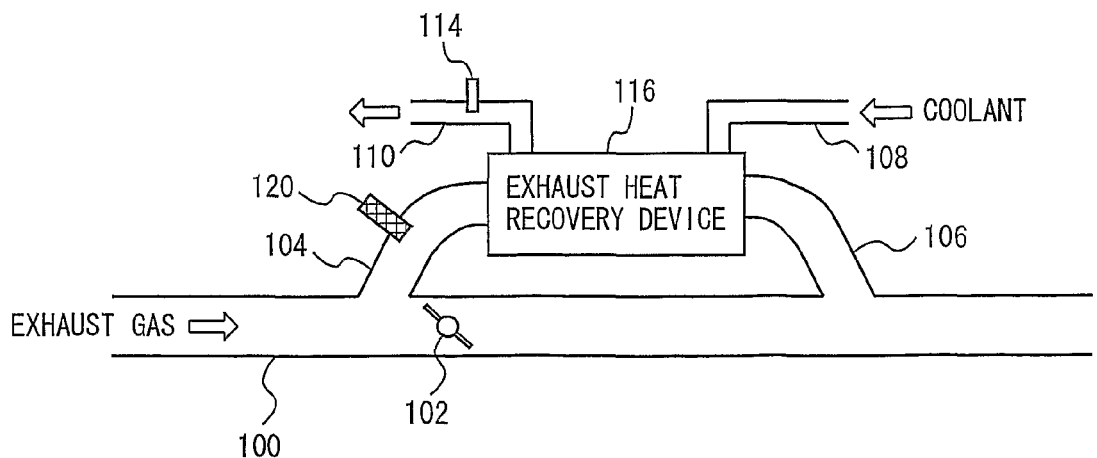
FIG. 5 shows a configuration of an exhaust heat recovery system in a third embodiment.

The present embodiment provides the exhaust heat recovery system's abnormality detection device different from that of the first embodiment in that, as shown in FIG. 5, upstream path 108 is not provided with upstream temperature sensor 112 and that bypass 106 is not provided with gas temperature sensor 118 and bypass 104 is instead provided with a gas temperature sensor 120. Except that, it is configured to be identical to that of the first embodiment and accordingly, labeled identically and also identical in function.

Gas temperature sensor 120 detects exhaust gas's temperature in bypass 104 and transmits to an ECU a detection signal corresponding to the exhaust gas's temperature as detected.

Furthermore in the present embodiment an engine is provided with a thermostat (not shown) introducing a medium (or coolant) from the engine to a radiator (not shown) in accordance with the medium's temperature. The thermostat is a valve closed and opened when the engine starts and the coolant is low and increased, respectively, in temperature.

When the thermostat is closed, a coolant path connected to the radiator is interrupted. Accordingly, the coolant is returned to the engine through a water pump. When the thermostat is open, the coolant is introduced from the engine through the coolant path to the radiator. The coolant is cooled in the radiator and thereafter returned through the water pump to the engine. The thermostat is an open and close valve mechanically opened in response to the coolant's temperature and may be implemented by well-known technique. Accordingly, it will not be described specifically.

The present exhaust heat recovery system's abnormality detection device or ECU is characterized in that it determines whether a switching valve has abnormality from how exhaust gas's temperature as detected by gas temperature sensor 120 varies with time. Furthermore, the ECU is also characterized in that it determines whether a thermostat has abnormality from a coolant's temperature as detected by downstream temperature sensor 114.

Figure 6:
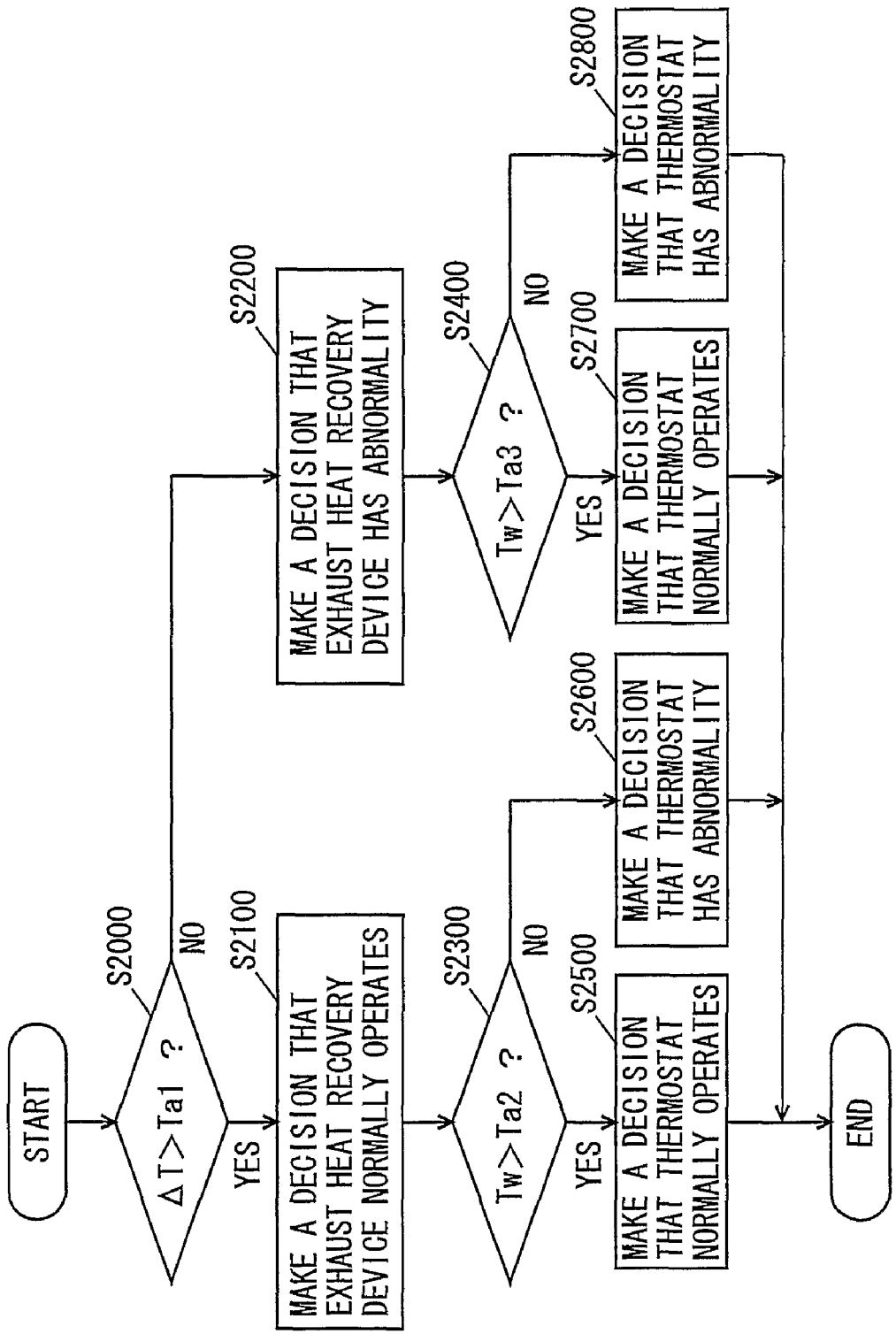
FIG. 6 is a flow chart representing a structure of a program for control executed by an ECU implementing an exhaust heat recovery system abnormality detection device in the third embodiment.

With reference to FIG. 6 the present exhaust heat recovery system's abnormality detection device or ECU executes a program structured for control, as will be described hereinafter.

At S2000 the ECU determines whether exhaust gas's temperature detected by gas temperature sensor 120 has a variation $\Delta T$ with time exceeding a predetermined value Ta1. The ECU determines variation $\Delta T$ from the exhaust gas's variation in temperature at predetermined temporal intervals. The ECU may be timed, as desired, to calculate temporal variation $\Delta T$, although it must be timed to do so after switching valve 102 is controlled to be closed. For example, the ECU may be timed to do so after switching valve 102 is controlled to be closed when a predetermined period of time elapses. Furthermore, the predetermined temporal interval is not limited to any particular interval. If the exhaust gas's variation in temperature exceeds predetermined value Ta1 (YES at S2000), the process proceeds with S2100. Otherwise (NO at S2000) the process proceeds with S2200.

At S2100 the ECU determines that exhaust heat recovery device 116 normally operates. In other words, the ECU determines that switching valve 102 normally operates. At S2200 the ECU determines that exhaust heat recovery device 116 has abnormality. In other words, the ECU determines that switching valve 102 has abnormality.

At S2300 when the coolant's temperature as detected attains a decision making temperature Tw the ECU determines whether the temperature is larger than a temperature Ta2 corresponding to a period elapsing before temperature Tw is attained.

"Temperature Ta2 corresponding to a period elapsing before temperature Tw is attained" is a temperature calculated from a quantity of heat recovered by exhaust heat recovery device 116 after switching valve 102 is controlled to be closed (or the engine is started) and before the coolant's temperature as detected attains temperature Tw, and from the coolant's variation in temperature estimated with the thermostat closed. The ECU for example stores a map representing a relationship between the coolant's lower limit value in temperature and time estimated with exhaust heat recovery device 116 and the thermostat in normal condition. Note that the relationship may not be provided in the form of a map; it may be represented in the form of a table, a mathematical expression, or the like. When temperature Tw is attained, the ECU refers to the map to calculate temperature Ta2 corresponding to the period elapsing after switching valve 102 to be closed and before temperature Tw is attained.

The quantity of heat recovered is calculated in the present embodiment from an amount of air aspirated into the engine, an amount of fuel injected, the engine's rate of rotation, and a gas capacity calculated for example from the coolant's temperature, a coefficient of heat transfer, and the like. This allows a quantity of heat recovered corresponding to the engine's condition to be calculated with high precision. Whether the switching valve has abnormality or not can be detected with high precision.

If temperature Tw is higher than temperature Ta2 (YES at S2300) the process proceeds with S2500. Otherwise (NO at S2300) the process proceeds with S2600.

At S2400 when downstream temperature sensor 114 detects a temperature attaining temperature Tw the ECU determines whether it is larger than a temperature Ta3 corresponding to a period elapsing before temperature Tw.

"Temperature Ta3 corresponding to a period elapsing before temperature Tw is attained" is a temperature calculated from the coolant's variation in temperature estimated after switching valve 102 is controlled to be closed (or the engine starts) and before the coolant's temperature as detected attains temperature Tw, with exhaust heat recovery device 116 failing to recover heat and the thermostat closed. The ECU for example stores a map representing a relationship between time and the coolant's lower limit value in temperature estimated when exhaust heat recovery device 116 is inactive and the thermostat has normal state. Note that the relationship may not be provided in the form of map and may for example be provided in the form of a table, a mathematical expression or the like. When temperature Tw is attained, the ECU refers to the map to calculate temperature Ta3 corresponding to the period elapsing after switching valve 102 is controlled to be closed and before temperature Tw is attained.

If temperature Tw is higher than temperature Ta3 (YES at S2400) the process proceeds with S2700. Otherwise (NO at S2400) the process proceeds with S2800.

At S2500 the ECU determines that the thermostat normally operates. At S2600 the ECU determines that the thermostat has abnormality. At S2700 the ECU determines that the thermostat normally operates. At S2800 the ECU determines that the thermostat has abnormality.

In accordance with such structure and flow chart as described above and with reference to FIGS. 7A-7D the present exhaust heat recovery system's abnormality detection device or ECU operates as will be described hereinafter.

Figure 7A:
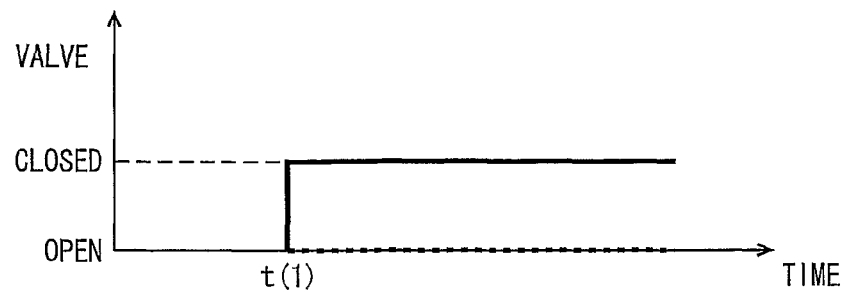
FIGS. 7A-7D are graphs for illustrating an operation of the ECU implementing the exhaust heat recovery system abnormality detection device in the third embodiment.
Figure 7B:
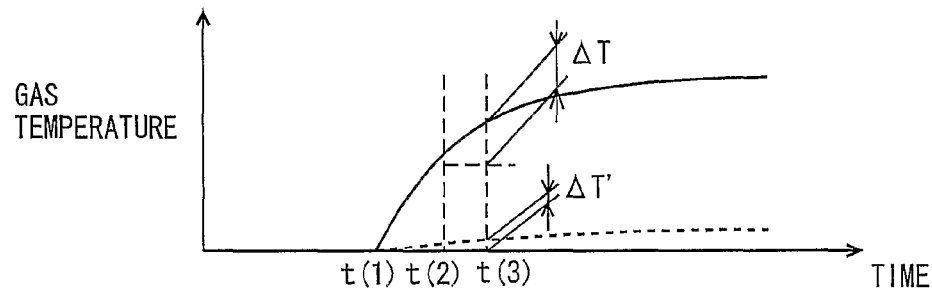

The engine starts, and, as shown in FIG. 7A, at time t(1) the ECU controls switching valve 102 to be closed and, as indicated in FIG. 7B by a solid line, gas temperature sensor 120 detects that the exhaust gas increases in temperature as time elapses. The ECU calculates the exhaust gas's variation ΔT in temperature for a t(2) to t(3), which is not limited to a specific period. If variation ΔT is lager than Ta1 (YES at S2000) a decision is made that exhaust heat recovery device 116 normally operates (S2100).

In contrast, the ECU controls switching value 102 to be closed and thereafter if the exhaust gas varies in temperature, as indicated in FIG. 7B by a dotted line, the exhaust gas's variation in temperature ΔT' for a period t(2) to t(3) is calculated. IF ΔT' is smaller than Ta1 (NO S2000) a decision is made that exhaust heat recovery device 116 has abnormality (S2200).

Figure 7C:
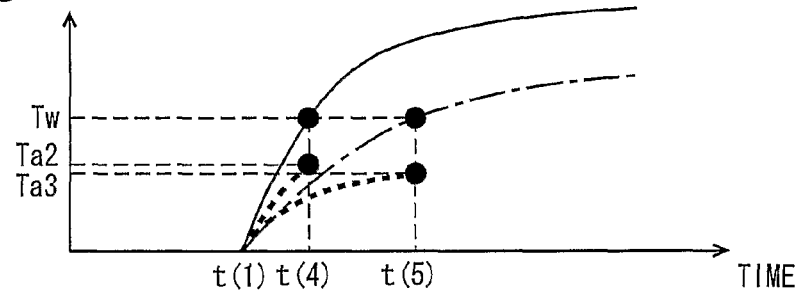

As indicated in FIG. 7C by a solid line, as the engine is activated and exhaust heat recovery device 116 recovers exhaust heat, downstream temperature sensor 114 detects that the coolant's temperature increases with time, and after the decision that exhaust heat recovery device 116 normal operates is made (S2100), or at time t(4), when the coolant's temperature as detected attains the predetermined temperature Tw, the map is referenced to calculate temperature Ta2 corresponding to time t(4). If temperature ta2 corresponding to time t(4) is smaller than temperature Tw (YES at S2300) a decision is made that the thermostat normally operates (S2500).

Furthermore, as indicated in FIG. 7C by a chained line, after the decision that exhaust heat recovery device 116 has abnormality is made (S2200), or at time t(5), when the coolant's temperature as detected attains the predetermined temperature Tw, the map is referenced to calculate temperature Ta3 corresponding to time t(5). If temperature ta3 corresponding to time t(5) is smaller than temperature Tw (YES at S2400) a decision is made that the thermostat normally operates (S2700).

Figure 7D:
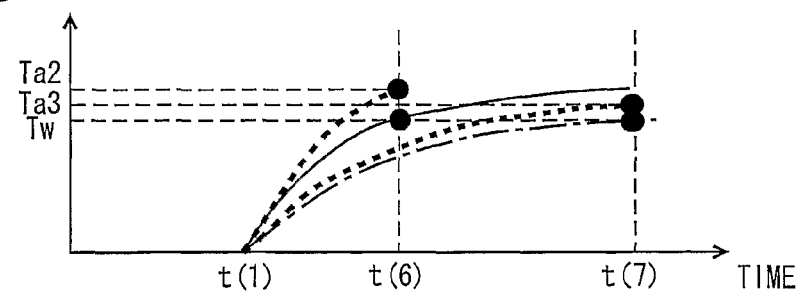

In contrast, as indicated in FIG. 7D by a solid line, after the decision that exhaust heat recovery device 116 normal operates is made (S2100), or at time t(6), when the coolant's temperature as detected attains the predetermined temperature Tw, the map is referenced to calculate temperature Ta2 corresponding to time t(6). If temperature ta2 corresponding to time t(6) is larger than temperature Tw (NO at S2300) a decision is made that the thermostat has abnormality (S2600).

Furthermore, as indicated in FIG. 7D by a chained line, after the decision that exhaust heat recovery device 116 has abnormality is made (S2200), or at time t(7), when the coolant's temperature as detected attains the predetermined temperature Tw, the map is referenced to calculate temperature Ta3 corresponding to time t(7). If temperature ta3 corresponding to time t(7) is larger than temperature Tw (NO at S2400) a decision is made that the thermostat has abnormality (S2800).

Thus in the present exhaust heat recovery system's abnormality detection device an ECU determines whether a switching valve has abnormality from exhaust gas's variation with time in temperature as detected. When the switching valve is switched to allow a bypass to have exhaust gas passing therethrough, a gas temperature sensor can detect that the exhaust gas's variation with time in temperature increases. Accordingly, when the switching valve is controlled to be closed and the exhaust gas's temperature thereafter detected has a variation with time in temperature smaller than temperature Ta1 as predetermined, a decision can be made that the exhaust gas is not passing through a bypass and hence the switching valve has abnormality. Thus the exhaust heat recovery system's abnormality detection device can detect that the switching valve allowing the exhaust heat recovery system to have exhaust gas passing therethrough, has abnormality.

Furthermore in warming up the engine if the thermostat has abnormality and the valve is open the coolant passes through the radiator. Accordingly, the medium hardly increases in temperature. As such, if temperature Tw is smaller than temperature Ta2 calculated from a quantity of heat recovered with the thermostat in abnormal condition and that of heat generated in the engine, a decision can be made that a radiator has the medium passing therethrough, i.e., that the thermostat has abnormality.

As described in the present embodiment, whether the switching valve has abnormality is determined from exhaust gas's variation with time in temperature as detected. Alternatively, it may be determined from variation with time in temperature of a coolant passing through exhaust heat recovery device 116. If a gas temperature sensor is employed, it directly detects exhaust gas's temperature. This can provide better responsiveness. However, it requires that the sensor be improved in heat resistance and durability. If a coolant temperature sensor is employed it detects variation in temperature after heat exchange. While it is inferior in responsiveness to the gas temperature sensor, the coolant temperature sensor is not required to be increased in heat resistance and durability.

Furthermore while in the present embodiment the downstream temperature sensor is provided at the downstream path, it is not limited thereto. More specifically, the sensor may be arranged at any path passing a coolant and a sensor detecting in temperature a coolant for an engine, as conventional, may be employed.

A map representing a relationship between an angle of switching valve 102 and an increase of output of gas temperature sensor 120 can also be used to determine whether switching valve 102 operates (or is switched on/off) abnormally and in addition thereto whether switching valve 102 opens abnormally.

Fourth Embodiment

A fourth embodiment provides an exhaust heat recovery system's abnormality detection device as will be described hereinafter.

The present embodiment provides the exhaust heat recovery system's abnormality detection device different from that of the third embodiment in that the ECU executes a program for control structured differently. Except that, it is configured to be identical to that of the third embodiment and accordingly, labeled identically and also identical in function.

Note that while in the present embodiment a coolant temperature sensor (not shown) detecting the temperature of a coolant for an engine, as conventional, is employed to detect the coolant's temperature, the present invention is not limited thereto as long as the coolant's temperature can be detected. More specifically, it may be arranged at any path that passes the coolant. For example, downstream temperature sensor 114 may detect the coolant's temperature.

Figure 8:
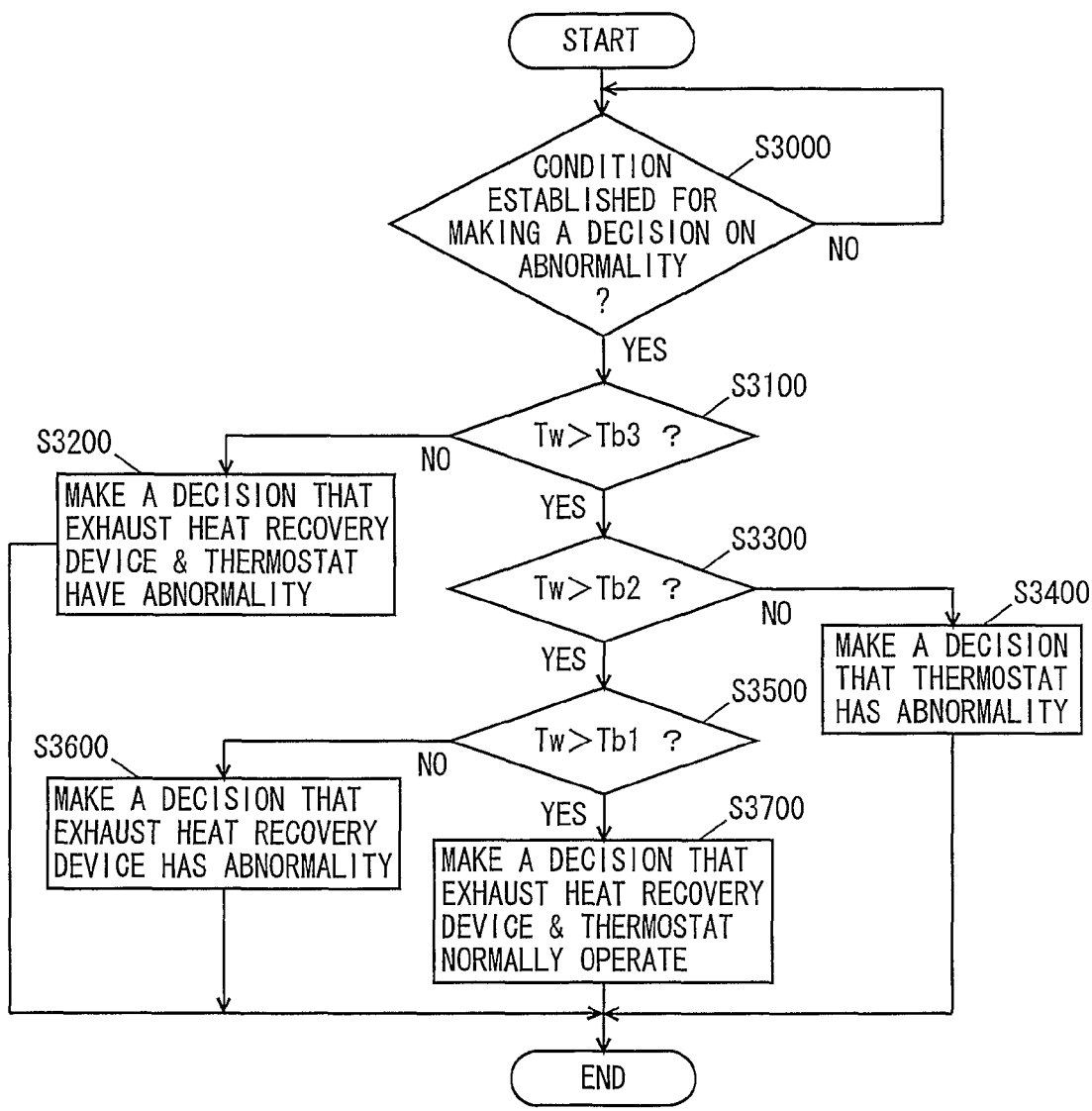
FIG. 8 is a flow chart representing a structure of a program for control executed by an ECU implementing an exhaust heat recovery system abnormality detection device in a fourth embodiment.

With reference to FIG. 8 the present exhaust heat recovery system's abnormality detection device or ECU executes a program structured for control, as will be described hereinafter.

At S3000 the ECU determines whether a condition is established for making a decision on abnormality. The condition is established for example when the engine is started and thereafter a coolant temperature sensor detects that the coolant's temperature attains a predetermined decision making temperature Tw. If the condition is established (YES at S3000) the process proceeds with S3100. Otherwise (NO at S3000) the process returns to S3000.

At S3100 when the coolant temperature sensor detects temperature Tw the ECU determines whether temperature is higher than temperature Tb3 corresponding to a period elapsing before temperature Tw is attained.

"Temperature Tb3 corresponding to a period elapsing before temperature Tw is attained" is a temperature calculated from the coolant's variation in temperature estimated after switching valve 102 is controlled to be closed (or the engine starts) and before the coolant's temperature as detected attains temperature Tw, with exhaust heat recovery device 116 failing to recover heat and the thermostat closed. The ECU for example stores a map representing a relationship between time and the coolant's lower limit value estimated when exhaust heat recovery device 116 is inactive and the thermostat has normal state. Note that the relationship may not be provided in the form of a map and may for example be provided in the form of a table, a mathematical expression or the like. When temperature Tw is attained, the ECU refers to the map to calculate temperature Tb3 corresponding to the period elapsing after switching valve 102 is controlled to be closed and before temperature Tw is attained.

If temperature Tw is higher than temperature Tb3 (YES at S3100) the process proceeds with S3300. Otherwise (NO at S3100) the process proceeds with S3200. At S3200 the ECU determines that exhaust heat recovery device 116 and the thermostat have abnormality.

At S3300 the ECU determines whether temperature Tw is larger than temperature Tb2 corresponding to the period elapsing before temperature Tw is attained.

"Temperature Tb2 corresponding to a period elapsing before temperature Tw is attained" is a temperature calculated from a quantity of heat recovered by exhaust heat recovery device 116 after switching valve 102 is controlled to be closed (or the engine is started) and before the coolant's temperature as detected attains temperature Tw, and from the coolant's variation in temperature estimated with the thermostat open. The ECU for example stores a map representing a relationship between the coolant's lower limit value in temperature and time estimated with exhaust heat recovery device 116 activated and the thermostat in abnormal condition. Note that the relationship may not be provided in the form of a map; it may be represented in the form of a table, a mathematical expression, or the like. When temperature Tw is attained, the ECU refers to the map to calculate temperature Tb2 corresponding to the period elapsing after switching valve 102 to be closed and before temperature Tw is attained.

The quantity of heat recovered is calculated in the present embodiment from an amount of air aspirated into the engine, an amount of fuel injected, the engine's rate of rotation, and a gas capacity calculated for example from the coolant's temperature, a coefficient of heat transfer, and the like. This allows a quantity of heat recovered corresponding to the engine's condition to be calculated with high precision. Whether the switching valve has abnormality or not can be detected with high precision.

If temperature Tw is higher than temperature Tb2 (YES at S3300) the process proceeds with S3500. Otherwise (NO at S3300) the process proceeds with S3400. At S3400 the ECU determines that the thermostat has abnormality.

At S3500 the ECU determines whether temperature Tw is larger than temperature Tb1 corresponding to the period elapsing before temperature Tw is attained.

"Temperature Tb1 corresponding to a period elapsing before temperature Tw is attained" is a temperature calculated from a quantity of heat recovered by exhaust heat recovery device 116 after switching valve 102 is controlled to be closed (or the engine is started) and before the coolant's temperature as detected attains temperature Tw, and from the coolant's variation in temperature estimated with the thermostat is closed. The ECU for example stores a map representing a relationship between the coolant's lower limit value in temperature and time estimated with exhaust heat recovery device 116 activated and the thermostat in normal condition. Note that the relationship may not be provided in the form of a map; it may be represented in the form of a table, a mathematical expression, or the like. When temperature Tw is attained, the ECU refers to the map to calculate temperature Tb1 corresponding to the period elapsing after switching valve 102 to be closed and before temperature Tw is attained.

If temperature Tw is higher than temperature Tb1 (YES at S3500) the process proceeds with S3700. Otherwise (NO at S3500) the process proceeds with S3600.

At S3600 the ECU determines that exhaust heat recovery device 116 has abnormality. More specifically, the ECU determines that switching valve 102 has abnormality. At S3700 the ECU determines that exhaust heat recovery device 116 and the thermostat both normally operate.

Figure 9:
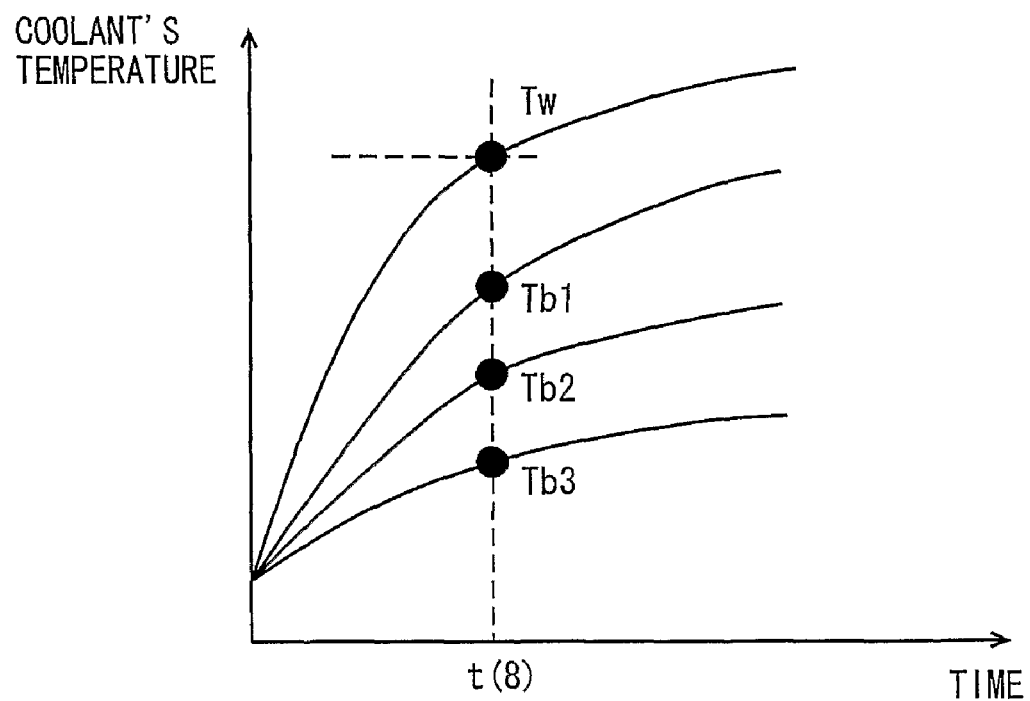
FIG. 9 is a graph representing how a medium varies in temperature, as detected by a temperature sensor, in the forth embodiment.

In accordance with such structure and flow chart as described above the present exhaust heat recovery system's abnormality detection device or ECU operates as will be described with reference to FIG. 9.

When the engine starts and switching valve 102 is closed, exhaust gas is introduced into bypass 104 and then exhaust heat recovery device 116 and contacts a heat exchanger therein. The exhaust gas and the heat exchanger exchange heat. Accordingly, a coolant temperature sensor detects that the coolant increases in temperature with time, and when the medium's temperature as detected attains Tw a condition is established for making a decision on abnormality (YES at S3000). When the coolant's temperature as detected attains Tw, or at time t(8), and temperature Tw is larger than temperature Tb3 calculated with reference to the map (YES at S3100), and larger than temperature Tb2 (YES at S3300) and temperature Tb1 (YES at S3500), a decision is made that exhaust heat recovery device 116 (or switching valve 102) and the thermostat normally operate (S3700).

If Tw is smaller than Tb3 (NO at S3100) a decision is made that exhaust heat recovery device 116 and the thermostat have abnormality (S3200). If Tw is larger than Tb3 (YES at S3100) and smaller than Tb2 (NO at S3300) a decision is made that the thermostat has abnormality (S3400). If Tw is larger than Tb3 (YES at S3100) and Tb2 (YES at S3300) and smaller than Tb1 (NO at S3500) a decision is made that exhaust heat recovery device 116 has abnormality (S3600).

Thus in the present exhaust heat recovery system's abnormality detection device when a temperature as detected attains a predetermined, decision making temperature Tw an ECU calculates temperature Tb1 corresponding to a period elapsing before temperature Tw is attained. If temperature Tw is smaller than temperature Tb1 the ECU determines that a switching valve has abnormality. Temperature Tb1 is calculated from a quantity of heat recovered by the exhaust heat recovery device with a bypass having exhaust gas passing therethrough, and a quantity of heat generated in the engine with the thermostat closed. As such, if temperature Tw is lower than temperature Tb1, a decision can be made that the exhaust heat recovery device fails to recover a quantity of heat as estimated, i.e., that the bypass is not passing exhaust gas. Thus a decision can be made that the switching valve has abnormality.

Furthermore if temperature Tw is smaller than temperature Tb2 the ECU determines that an open and close valve has abnormality. Temperature Tb2 is calculated from a quantity of heat recovered by the exhaust heat recovery device and a quantity of heat generated in the engine with the thermostat open. As such, if temperature Tw is lower than temperature Tb2, a decision can be made that a radiator passes a medium, i.e., the open and close valve has abnormality.

Furthermore if temperature Tw is smaller than temperature Tb3 the ECU determines that the thermostat and the switching valve have abnormality. Temperature Tb3 is calculated for example from a quantity of heat generated in the engine when the thermostat is open and the bypass also does not have exhaust gas passing therethrough. Accordingly, if temperature Tw is lower than temperature Tb3, a decision can be made that the thermostat is open and the bypass is also not passing exhaust gas. Thus a decision can be made that the open and close valve and the switching valve both have abnormality.

Note that Tb1, Tb2 and Tb3 are not limited to any particular relationship in magnitude; they are each set depending on the engine cooling system's structure, performance and the like.

Fifth Embodiment

A fifth embodiment provides an exhaust heat recovery system's abnormality detection device as will be described hereinafter.

The present embodiment provides the exhaust heat recovery system's abnormality detection device different from that of the third embodiment in that the ECU executes a program for control structured differently. Except that, it is configured to be identical to that of the third embodiment and accordingly, labeled identically and also identical in function.

Note that while in the present embodiment a coolant temperature sensor detecting the temperature of a coolant for an engine, as conventional, is employed to detect the coolant's temperature, the present invention is not limited thereto as long as the coolant's temperature can be detected. More specifically, it may be arranged at any path that passes the coolant. For example, downstream temperature sensor 114 may detect the coolant's temperature.

Figure 10:
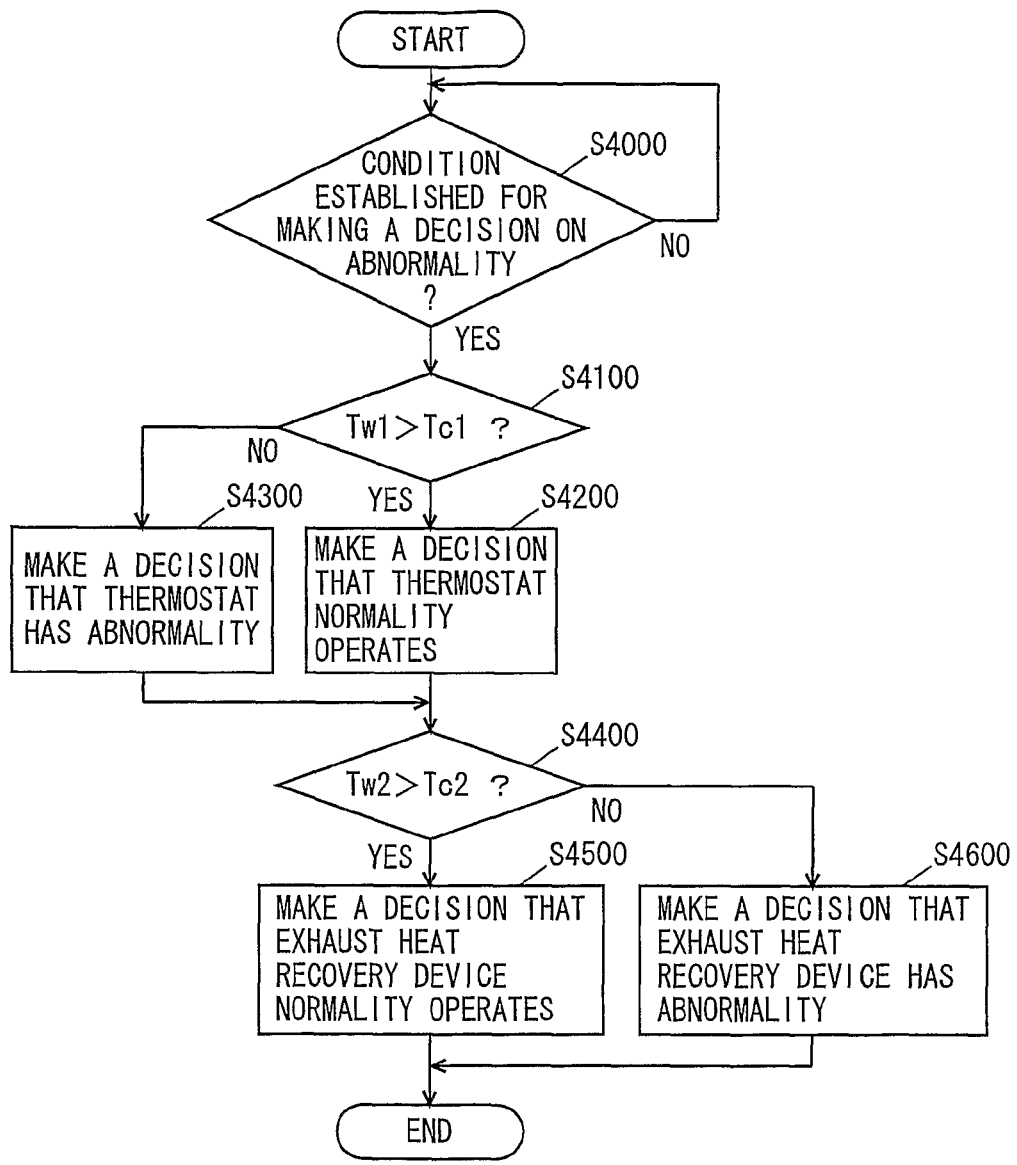
FIG. 10 is a flow chart representing a structure of a program for control executed by an ECU implementing an exhaust heat recovery system abnormality detection device in a fifth embodiment.

With reference to FIG. 10 the present exhaust heat recovery system's abnormality detection device or ECU executes a program structured for control, as will be described hereinafter.

At S4000 the ECU determines whether a condition is established for making a decision on abnormality. The condition is established for example when the engine is started and thereafter the coolant temperature sensor detects that the coolant's temperature attains a predetermined decision making temperature Tw1. If the condition is established (YES at S4000) the process proceeds with S4100. Otherwise (NO at S4000) the process, returns to S4000.

At S4100 when the coolant temperature sensor detects temperature Tw1 the ECU determines whether the temperature is higher than temperature Tc1 corresponding to a period elapsing before temperature Tw1 is attained.

"Temperature Tc1 corresponding to a period elapsing before temperature Tw1 is attained" is a temperature calculated from the coolant's variation in temperature estimated after the engine is started and before the coolant's temperature as detected attains temperature Tw1, with the thermostat closed. The ECU for example stores a map representing a relationship between time and the coolant's lower limit value in temperature estimated when exhaust heat recovery device 116 is inactive and the thermostat has normal state. Note that the relationship may not be provided in the form of a map and may for example be provided in the form of a table, a mathematical expression or the like. When temperature Tw is attained, the ECU refers to the map to calculate temperature Tc1 corresponding to the period elapsing after the engine is started and before temperature Tw is attained.

If temperature Tw is larger than Tc1 (YES at S4100) the process proceeds with S4200. Otherwise (NO at S4100) the process proceeds with S4300.

At S4200 the ECU determines that the thermostat normally operates. At S4300 the ECU determines that the thermostat has abnormality.

At S4400 when the coolant temperature sensor detects a decision making temperature Tw2 the ECU determines whether it is larger than temperature Tc2 corresponding to a period elapsing before temperature Tw1 is attained. In the present embodiment when the coolant temperature sensor detects temperature Tw1 the ECU controls switching valve 102 to be closed.

"Temperature Tc2 corresponding to a period elapsing before temperature Tw2 is attained" is a temperature calculated from a quantity of heat recovered by exhaust heat recovery device 116 after switching valve 102 is controlled to be closed and before the coolant's temperature as detected attains temperature Tw2. The ECU for example stores a map representing a relationship between the coolant's lower limit value in temperature and time estimated with exhaust heat recovery device 116 activated. Note that the relationship may not be provided in the form of a map; it may be represented in the form of a table, a mathematical expression, or the like. When temperature Tw2 is attained, the ECU refers to the map to calculate temperature Tc2 corresponding to the period elapsing after switching valve 102 to be closed and before temperature Tw2 is attained.

The quantity of heat recovered is calculated in the present embodiment from an amount of air aspirated into the engine, an amount of fuel injected, the engine's rate of rotation, and a gas capacity calculated for example from the coolant's temperature, a coefficient of heat transfer, and the like. This allows a quantity of heat recovered corresponding to the engine's condition to be calculated with high precision. Whether the switching valve has abnormality or not can be detected with high precision.

If temperature Tw2 is higher than temperature Tc2 (YES at S4400) the process proceeds with S4500. Otherwise (NO at S4400) the process proceeds with S4600.

At S4500 the ECU determines that exhaust heat recover device 116 normally operates. More specifically, the ECU determines that switching valve 102 normal operates. At S4600 the ECU determines that exhaust heat recovery device 116 has abnormality. More specifically, the ECU determines that switching valve 102 has abnormality.

Figure 11:
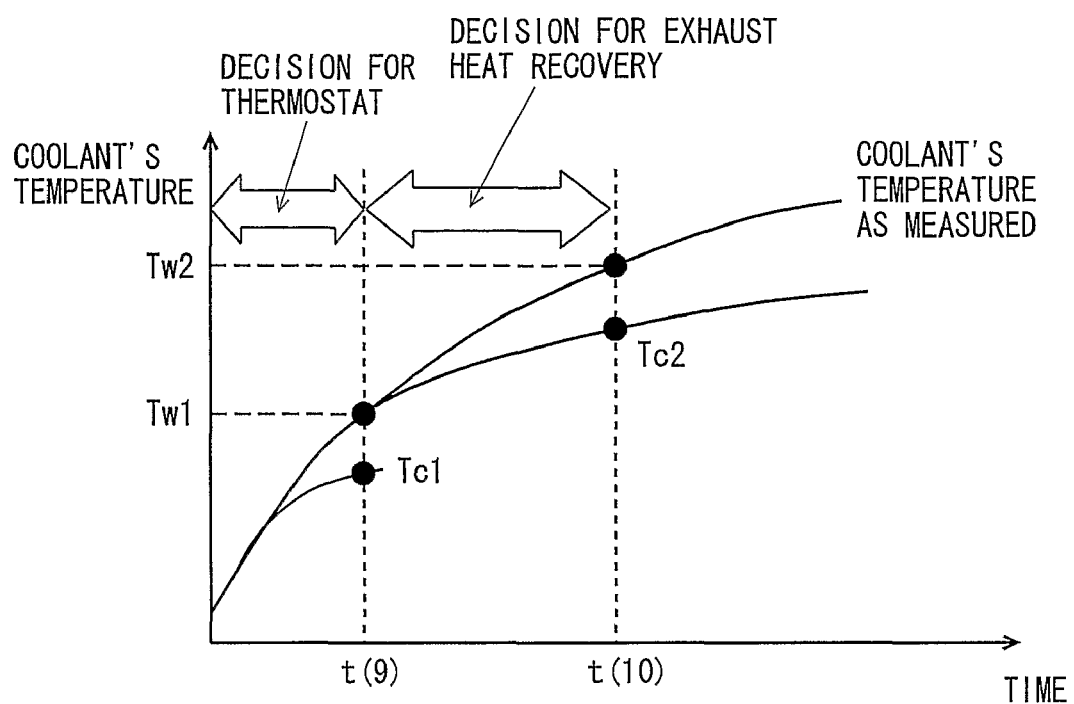
FIG. 11 is a graph representing how a medium varies in temperature, as detected by a temperature sensor in the fifth embodiment.

In accordance with such structure and flow chart as described above the present exhaust heat recovery system's abnormality detection device or ECU operates as will be described with reference to FIG. 11.

When the engine is started and starts to warm up, the coolant is increased in temperature with time by heat generated in the engine. Switching valve 102 is open. When the coolant temperature sensor detects that the medium attains temperature Tw1 a condition is established for making a decision on abnormality (YES at S4000). When the sensor detects temperature Tw1, or at time t(9), and temperature Tw1 is larger than temperature Tc1 calculated with reference to the map (YES at S4100) a decision is made that the thermostat normally operates (S4200). If temperature Tw1 is smaller than temperature Tc1 (NO at S4100) a decision is made that the thermostat has abnormality (S4300).

When the coolant temperature sensor detects temperature Tw1 switching valve 102 is controlled to be closed and exhaust heat recovery device 116 is actuated. Exhaust heat recovery device 116 recovers a quantity of heat and the engine generates a quantity of heat and accordingly temperature increases. When the coolant temperature sensor detects temperature Tw2, or at time t(10), and temperature Tw2 is larger than temperature Tc2 calculated with reference to the map (YES at S4400) a decision is made that exhaust heat recovery device 116 normally operates (S4500). If temperature Tw2 is smaller than temperature Tc2 (NO at S4400) a decision is made that exhaust heat recovery device 116 has abnormality (S4600).

Thus in the present exhaust heat recovery system's abnormality detection device when decision making temperature Tw1 is smaller than temperature Tc1 calculated with reference to a map an ECU determines that a thermostat has abnormality. Temperature Tc1 is a lower limit value of temperature calculated from a coolant's variation in temperature estimated when the thermostat is closed. As such, if temperature Tw1 is lower than temperature Tc1, a decision can be made that a radiator passes a medium, i.e., the thermostat has abnormality.

When temperature Tw1 as detected attains the predetermined temperature Tw1 the ECU controls switching valve 102 to be closed, and when temperature Tw2 as detected attains the predetermined temperature Tw2 the ECU references the map to calculate temperature Tc2 corresponding to a period elapsing after switching valve 102 is closed and before Tw2 is attained. If temperature Tw2 is smaller than temperature Tc2 as calculated, the ECU determines that the switching valve has abnormality. Temperature Tc2 is calculated from a quantity of heat recovered by the exhaust heat recovery device. Accordingly, if temperature Tw2 is lower than temperature Tc2, a decision can be made that the exhaust heat recovery device does not recover a quantity of heat as estimated, i.e., a bypass is not passing exhaust gas and hence that the switching valve has abnormality.

Furthermore after the ECU determines whether the thermostat has abnormality the ECU determines whether the switching valve has abnormality. Making the decisions at different temporal points, respectively, can prevent erroneous decision and allows a decision on abnormality to be made with high precision.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. An abnormality detection device detecting whether an exhaust heat recovery system recovering exhaust heat from exhaust gas exhausted from an engine has abnormality, said exhaust heat recovery system including a bypass connected parallel to an exhaust path passing said exhaust gas, an exhaust heat recovery unit provided at said bypass to recover said exhaust heat, and a switching valve switched to pass said exhaust gas through said bypass the abnormality detection device comprising:
    gas temperature detection means disposed at at least one of said bypass and said exhaust path for detecting said exhaust gas's temperature; and
    determination means for determining from said temperature whether said switching valve has abnormality; and
    means for detecting said engine's rate of rotation, wherein said determination means determines whether said switching valve has abnormality from whether said temperature and said rate of rotation have a relationship corresponding to a predetermined relationship.

2. An abnormality detection device detecting whether an exhaust heat recovery system recovering exhaust heat from exhaust gas exhausted from an engine has abnormality, said exhaust heat recovery system including a bypass connected parallel to an exhaust path passing said exhaust gas, an exhaust heat recovery unit provided at said bypass to recover said exhaust heat, and a switching valve switched to pass said exhaust gas through said bypass, the abnormality detection device comprising:
    gas temperature detection means disposed at at least one of said bypass and said exhaust path for detecting said exhaust gas's temperature; and
    determination means for determining from said temperature whether said switching valve has abnormality, wherein said determination means includes means for determining whether said switching valve has abnormality from said temperature's variation with time.

3. An abnormality detection device of an exhaust heat recovery system detecting whether an exhaust heat recovery system recovering exhaust heat from exhaust gas exhausted from an engine has abnormality, said exhaust heat recovery system including a bypass connected parallel to an exhaust path passing said exhaust gas, an exhaust heat recovery unit provided at said bypass to recover said exhaust heat, and a switching valve switched to pass said exhaust gas through said bypass, the abnormality detection device comprising:
    recovery detection means for detecting exhaust heat recovery done by said exhaust heat recovery unit; and
    determination means for determining from said exhaust heat recovery whether said switching valve has abnormality.

4. The abnormality detection device according to claim 3, further comprising means for detecting said engine's rate of rotation, wherein said determination means includes means for determining whether said switching valve has abnormality from whether said exhaust heat recovery and said rate of rotation have a relationship corresponding to a predetermined relationship.

5. The abnormality detection device according to claim 3, wherein:
    said exhaust heat recovery unit includes a heat exchanger disposed on said bypass and a medium path passing a medium through said heat exchanger; and
    said recovery detection means includes means for detecting said exhaust heat recovery from said medium's variation in temperature.

6. The abnormality detection device according to claim 5, wherein:
    said medium path includes an upstream path introducing said medium into said heat exchanger, and a downstream path guiding and thus outputting said medium from said heat exchanger;
    said recovery detection means includes means for detecting an upstream temperature of said medium passing through said upstream path, and means for detecting a downstream temperature of said medium passing through said downstream path; and
    said determination means includes means for determining from a difference between said upstream and downstream temperatures whether switching valve has abnormality.

7. The abnormality detection device according to claim 5, wherein:
    said recovery detection means includes means for detecting said medium's temperature; and said determination means includes means responsive to said means for detecting said medium's temperature detecting a predetermined first decision making temperature, for calculating a first temperature corresponding to a period elapsing before said first decision making temperature is attained, and means responsive to said first decision making temperature smaller than said first temperature for determining that said switching valve has abnormality.

8. The abnormality detection device according to claim 7, wherein said first temperature is a temperature calculated from a quantity of heat recovered by said exhaust heat recovery unit when said bypass passes said exhaust gas.

9. The abnormality detection device according to claim 8, wherein said quantity of heat is calculated from an amount of air aspirated by said engine, an amount of fuel injected, said engine's rate of rotation, and said medium's temperature.

10. The abnormality detection device according to claim 7, said medium path being connected to a cooling path of said engine, said engine being provided with an open and close valve introducing said medium from said engine to a radiator in accordance with said medium's temperature, the abnormality detection device further comprising:
means responsive to said means for detecting said medium's temperature detecting a predetermined second decision making temperature, for calculating a second temperature corresponding to a period elapsing before said second decision making temperature is attained; and
abnormality determination means responsive to said second decision making temperature smaller than said second temperature for determining that said open and close valve has abnormality.

11. The abnormality detection device according to claim 10, wherein said second temperature is a temperature calculated from said medium's variation in temperature estimated when said radiator does not have said medium passing therethrough.

12. The abnormality detection device according to claim 10, said first decision making temperature being equal to said second decision making temperature, the abnormality detection device further comprising:
means responsive to said means for detecting said medium's temperature detecting said first decision making temperature, for calculating a predetermined third temperature corresponding to a period elapsing before said first decision making temperature is attained; and
means responsive to said first decision making temperature smaller than said third temperature for determining that said open and close valve and said switching valve have abnormality.

13. The abnormality detection device according to claim 12, wherein said third temperature is a lower one of temperatures calculated from said medium's variation in temperature estimated when either one of said open and close valve and said switching valve is in abnormal condition.

14. The abnormality detection device according to claim 10, said first decision making temperature being different from said second decision making temperature, wherein said determination means includes means for determining whether said switching valve has abnormality at a temporal point different than when said abnormality determination means determines whether said open and close valve has abnormality.

15. The abnormality detection device according to claim 14, wherein said determination means includes means for determining whether said switching valve has abnormality after said abnormality determination means determines whether said open and close valve has abnormality.

16. The abnormality detection device according to claim 7, wherein:
said medium path includes a downstream path guiding and thus outputting said medium from said heat exchanger; and
said recovery detection means includes means for detecting said medium's temperature at said downstream path.

17. An abnormality detection device detecting whether an exhaust heat recovery system recovering exhaust heat from exhaust gas exhausted from an engine has abnormality, said exhaust heat recovery system including a bypass connected parallel to an exhaust path passing said exhaust gas, an exhaust heat recovery unit provided at said bypass to recover said exhaust heat, and a switching valve switched to pass said exhaust gas through said bypass, the abnormality detection device comprising:
a gas temperature detector disposed at at least one of said bypass and said exhaust path to detect said exhaust gas's temperature; and
a determinator determining from said temperature whether said switching valve has abnormality; and
a rotation rate detector detecting said engine's rate of rotation, wherein said determinator determines whether said switching valve has abnormality from whether said temperature and said rate of rotation have a relationship corresponding to a predetermined relationship.

18. An abnormality detection device detecting whether an exhaust heat recovery system recovering exhaust heat from exhaust gas exhausted from an engine has abnormality, said exhaust heat recovery system including a bypass connected parallel to an exhaust path passing said exhaust gas, an exhaust heat recovery unit provided at said bypass to recover said exhaust heat, and a switching valve switched to pass said exhaust gas through said bypass, the abnormality detection device comprising:
a gas temperature detector disposed at at least one of said bypass and said exhaust path to detect said exhaust gas's temperature; and
a determinator determining from said temperature whether said switching valve has abnormality, wherein said determinator determines whether said switching valve has abnormality from said termperature's variation with time.

19. An abnormality detection device of an exhaust heat recovery system detecting whether an exhaust heat recovery system recovering exhaust heat from exhaust gas exhausted from an engine has abnormality, said exhaust heat recovery system including a bypass connected parallel to an exhaust path passing said exhaust gas, an exhaust heat recovery unit provided at said bypass to recover said exhaust heat, and a switching valve switched to pass said exhaust gas through said bypass, the abnormality detection device comprising:
a recovery detector detecting exhaust heat recovery done by said exhaust heat recovery unit; and
a determinator determining from said exhaust heat recovery whether said switching valve has abnormality.

20. The abnormality detection device according to claim 19, further comprising rotation rate detector detecting said engine's rate of rotation, wherein said determinator determines whether said switching valve has abnormality from whether said exhaust heat recovery and said rate of rotation have a relationship corresponding to a predetermined relationship.

21. The abnormality detection device according to claim 19, wherein:

said exhaust heat recovery unit includes a heat exchanger disposed on said bypass and a medium path passing a medium through said heat exchanger; and said recovery detector detects said exhaust heat recovery from said medium's variation in temperature.

22. The abnormality detection device according to claim 21, wherein:

said medium path includes an upstream path introducing said medium into said heat exchanger, and a downstream path guiding and thus outputting said medium from said heat exchanger;

said recovery detector includes an upstream temperature detector detecting an upstream temperature of said medium passing through said upstream path, and a downstream temperature detector detecting a downstream temperature of said medium passing through said downstream path; and said determinator determines from a difference between said upstream and downstream temperatures whether switching valve has abnormality.

23. The abnormality detection device according to claim 21, wherein:

said recovery detector includes a temperature detector detecting said medium's temperature; and said determinator includes a first temperature calculator operative in response to said medium's temperature as detected attaining a predetermined first decision making temperature to calculate a first temperature corresponding to a period elapsing before said first decision making temperature is attained, and a first abnormality determinator determining that said switching valve has abnormality when said first decision making temperature is smaller than said first temperature.

24. The abnormality detection device according to claim 23, wherein said first temperature is a temperature calculated from a quantity of heat recovered by said exhaust heat recovery unit when said bypass passes said exhaust gas.

25. The abnormality detection device according to claim 24, wherein said quantity of heat is calculated from an amount of air aspirated by said engine, an amount of fuel injected, said engine's rate of rotation, and said medium's temperature.

26. The abnormality detection device according to claim 23, said medium path being connected to a cooling path of said engine, said engine being provided with an open and close valve introducing said medium from said engine to a radiator in accordance with said medium's temperature, the abnormality detection device further comprising:

a second temperature calculator operative in response to said medium's temperature as detected attaining a predetermined second decision making temperature to calculate a second temperature corresponding to a period elapsing before said second decision making temperature is attained; and a second abnormality determinator determining that said open and close valve has abnormality when said second decision making temperature is smaller than said second temperature.

27. The abnormality detection device according to claim 26, wherein said second temperature is a temperature calculated from said medium's variation in temperature estimated when said radiator does not have said medium passing therethrough.

28. The abnormality detection device according to claim 26, said first decision making temperature being equal to said second decision making temperature, the abnormality detection device further comprising:

a third temperature calculator operative in response to said medium's temperature as detected attaining said first decision making temperature to calculate a predetermined third temperature corresponding to a period elapsing before said first decision making temperature is attained; and a third abnormality determinator determining that said open and close valve and said switching valve have abnormality when said first decision making temperature is smaller than said third temperature.

29. The abnormality detection device according to claim 28, wherein said third temperature is a lower one of temperatures calculated from said medium's variation in temperature estimated when either one of said open and close valve and said switching valve is in abnormal condition.

30. The abnormality detection device according to claim 26, said first decision making temperature being different from said second decision making temperature, wherein said determinator determines whether said switching valve has abnormality at a temporal point different than when said second abnormality determinator determines whether said open and close valve has abnormality.

31. The abnormality detection device according to claim 30, wherein said determinator determines whether said switching valve has abnormality after said second abnormality determinator determines whether said open and close valve has abnormality.

32. The abnormality detection device according to claim 23, wherein:

said medium path includes a downstream path guiding and thus outputting said medium from said heat exchanger; and said recovery detector detects said medium's temperature at said downstream path.

* * * * *